Jan. 7, 1964 A. MÜLLER 3,116,591
SPINNING OR TWINING SPINDLE BRAKE ARRANGEMENT
Filed April 18, 1962

Adrian Müller
Inventor
By Wenderoth, Lind
and Ponack, attorneys

Jan. 7, 1964 A. MÜLLER 3,116,591
SPINNING OR TWINING SPINDLE BRAKE ARRANGEMENT
Filed April 18, 1962 4 Sheets-Sheet 4

United States Patent Office 3,116,591
Patented Jan. 7, 1964

3,116,591
SPINNING OR TWINING SPINDLE BRAKE
ARRANGEMENT
Adrian Müller, Aire, Geneva, Switzerland, assignor to Machine Tool Works Oerlikon, Administration Company, Zurich-Oerlikon, Switzerland
Filed Apr. 18, 1962, Ser. No. 188,429
Claims priority, application Switzerland Apr. 21, 1961
7 Claims. (Cl. 57—88)

The present invention relates to a spinning or twining spindle with an upper portion capable of being lifted off, but secured against unintentional lifting off, and having a brake which contains a brake element capable of being moved against spring bias from a normal position into a braking position, and a whorl, which has a flange-like extension below its pulley surface.

Spindles of the aforesaid type are known in numerous embodiments. Brake devices are for example known with embodiments having one or two brake levers as internal or external shoe brakes, and likewise there exist safety devices against the unintentional lifting off of the upper spindle portion, which retain the whorl of the upper spindle portion from inside or from outside on its extension, which is formed as an inner or outer flange.

The present invention has for its object that the same structural components may serve both for braking the spindle and for securing its upper portion against being lifted off unintentionally.

The invention has solved this problem whereby the flange-like extension of the whorl reaches under the brake element in its normal position, and the brake can be detained in a middle position. A control slide is provided, which is capable of being shifted to-and-fro in two opposite directions from a position corresponding to the middle position of the brake, and in driving connection with the brake element, which thus can be brought into a release position so that the brake element in the middle position of the brake lies in its normal position, and the control slide when shifted in one direction brings the brake element into the braking position, and when shifted in the opposite direction moves the brake element into the release position and out of the range of the flange-like extension.

Thereby the advantage is attained that in the simplest manner the components for the braking and for the securing can be accommodated in a common casing, which is clamped between the spindle flange and the spindle bank and which encloses the spindle flange and the flange-like extension, allowing the pulley surface of the whorl and the lower portion of the spindle to emerge each through a corresponding bore. Such a casing, which can be constructed for each spindle separately or for a group of spindles, has the advantage that it can be given a simple and smooth shape, so that the fluff of fibres cannot readily deposit itself thereon, and can be easily removed.

Embodiments of the invention will be described in more detail with reference to the accompanying drawings, in which.

In the various embodiments the corresponding parts are denoted by the same reference characters.

Figure 3:
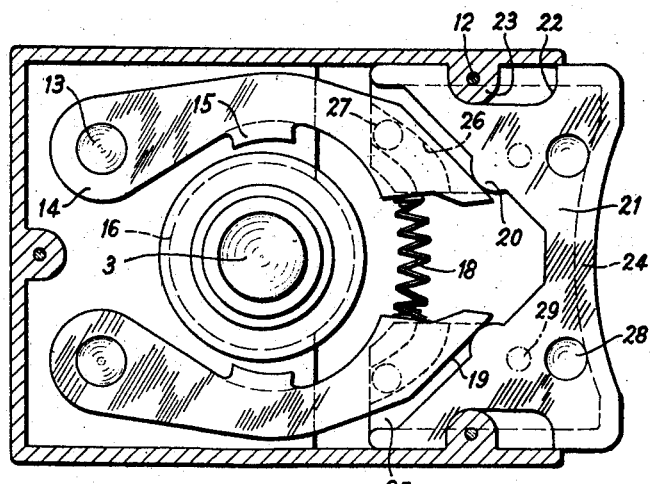
FIG. 3 is the same plan view with the upper portion of the spindle released.
Figure 4:
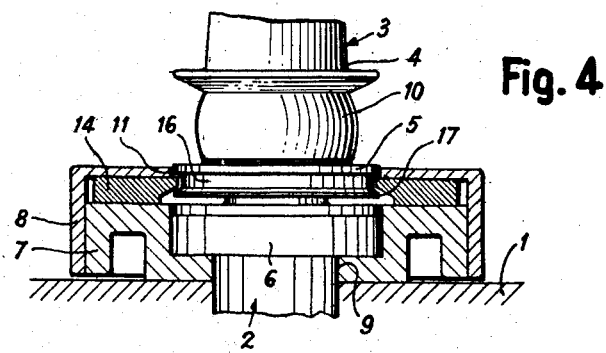
FIG. 4 is an elevation of the spindle, the casing and the brake levers being illustrated in section.

In the spindle bank 1 the spindle is attached with its lower portion 2 in a normal manner, not described in detail (see FIG. 4). In the lower spindle portion 2 the upper spindle portion 3 with its whorl 4 and the flange-like extension 5 thereof is journalled in the usual manner. Between the spindle bank 1 and the flange 6 provided on the lower spindle portion, a casing is clamped in, which comprises a base plate 7 and a cover 8, the lower spindle portion 2 projecting downwardly through a bore 9 in the base plate 7, and the pulley surface 10 of the whorl 4 projecting upwardly through a bore 11 in the cover 8. The two parts of the casing, namely the base plate 7 and the cover 8 are held together by means of dowel pins 12 (see FIGS. 1 to 3 and 9). By means of upright bolts 13 with their axes parallel to the spindle two brake elements are pivoted, respectively, which are constructed as brake levers 14 embracing the spindle at the level of the said flange-like extension, and which are capable of engaging with their shoes 15 into a circular recess 16 provided on the flange-like extension 5, depending on their position.

Figure 1:
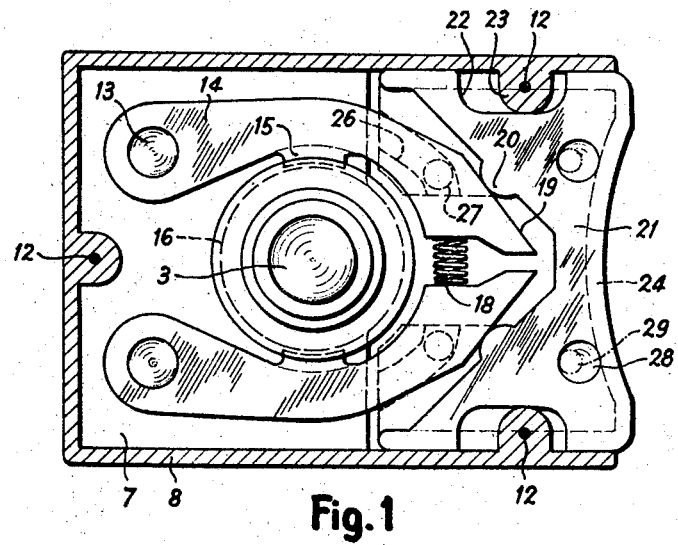
FIG. 1 is a plan view of a spindle in the normal state of operation, with the casing cover plate cut away.
Figure 2:
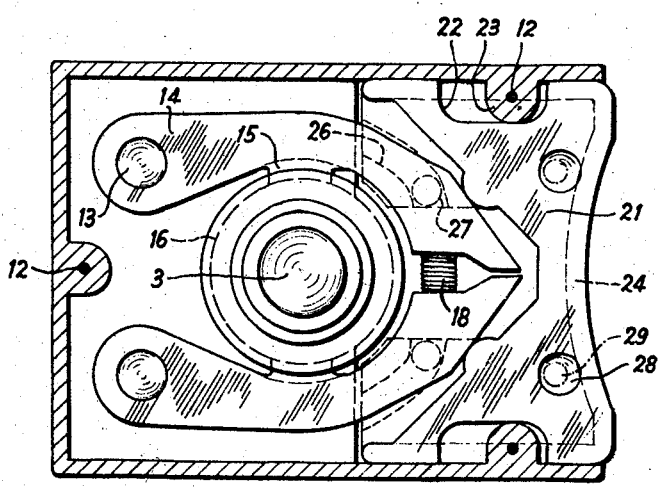
FIG. 2 is the same plan view with the upper portion of the spindle braked.

In the FIGS. 1 to 3 the three different main positions of the brake levers 14 are illustrated, which are pivotable in a plane perpendicular to the axis of the spindle. In FIG. 1 the brake levers assume their normal position, in which they do not touch, and accordingly do not brake, the spindle. It is, however, essential that the flange-like extension 5 reaches with its collar 17 under the shoes 15 of the brake levers 14.

In FIG. 2 the brake levers assume the braking position, in which the brake shoes 15 are applied to the circular recess 16.

FIG. 3 shows the third position of the brake levers, in which the same are spread out to such an extent that the brake shoes 15 do no longer reach under the collar 17.

Figure 5:
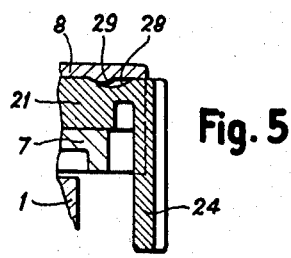
FIG. 5 is a detail of a detent device in section, in the normal state of operation.
Figure 6:
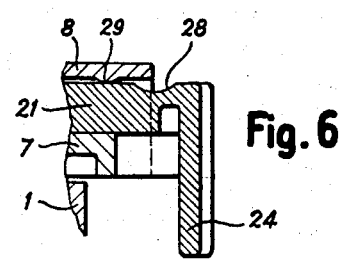
FIG. 6 shows the same detent device with the upper spindle portion released.

The two brake levers 14 are forced apart by a spring 18, so that ramps 19 of the brake levers 14 come into contact with warts 20 of a control slide 21. This control slide 21, as viewed from the side of the operator of the spindle, is arranged in front of the whorl 4, and can be shifted towards the whorl from a position corresponding to the middle position of the brake, and in the direction opposite thereto. For this purpose it is guided slidably between the cover 8 and the base plate 7, two recesses 22 in the control slide 21 and two bulges 23 on the cover 8 limiting, however, this slidability. The control slide 21 carries at its extreme forward end a closure ledge 24, which forms the frontal closure of the casings 7, 8, and which moreover is constructed to form a presser body for operation by the knee and as a hand grip for releasing the bottom portion of the spindle. For this reason the control slide 21 protrudes with its closure ledge 24 beyond the casings 7, 8, and the spindle bank 1 (see FIGS. 5 and 6). On the control slide 21 moreover two lugs 25 are arranged, each of which has a groove 26 into which engages a pin 27, which is in turn fixedly connected to the brake lever 15.

Moreover the control slide 21 has two recesses 28, which in the middle position of the brake form a detent together with the excrescences 29 arranged on the cover 8. The recesses 28 in the control slide 21 exceed in diameter the excrescences 29 by at least the path of the brake application.

Figure 7:
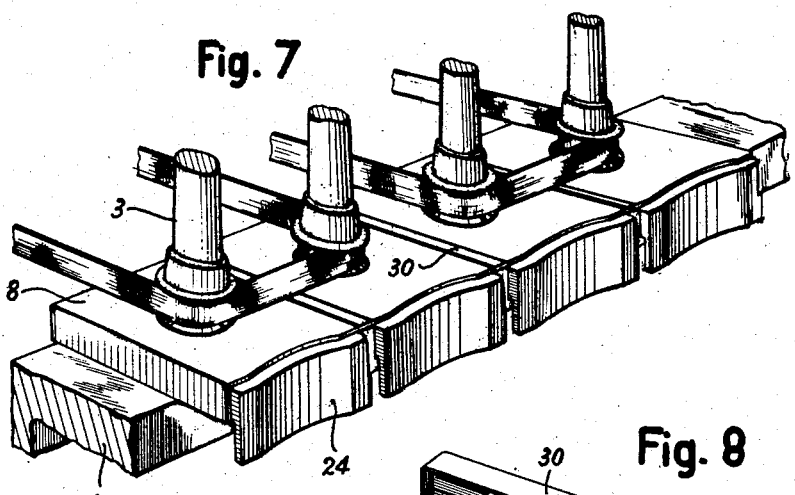
FIG. 7 is a perspective view of a group of four spindles.
Figure 8:
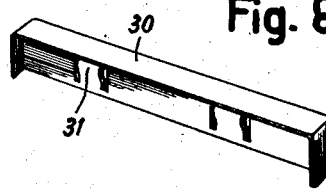
FIG. 8 is a perspective view of a cover ledge for covering the gaps between the individual casings.

In FIG. 7 it is shown, how in a spindle bank the spindles are arranged in a row and accordingly the casings are arranged in a row, and how the gaps between the individual casings may be covered by means of cover ledges. These cover ledges 30 have advantageously a T-shaped profile and are provided with clamping means of some sort, for example with leaf springs 31. Alternatively, clamping means of rubber or resilient synthetic materials may be used.

In the normal operational position of the spindle the brake is in its middle position according to FIG. 1. The spring 18 tends to space the two brake levers 14 apart, and the same by their ramps 19, force the control slide so far back into the rest position, that the recesses 28 abut the excrescences 29. When applying the brake to the spindle, the control slide 21 is shifted by the knee towards the whorl 4, the warts 20 forcing the two brake levers towards one another against the bias of the spring 18, until the two brake shoes 15 contact the annular recess 16, and brake the spindle. In this movement the excrescences 29 displace themselves in the recesses 28, without however abutting the other edge of the recesses 28. When releasing the control slide, the spring 18 forces the two brake levers 14 apart again, and the cotnrol slide 21 is returned to the middle position described, while the brake shoes 15 yet reach under the collar 17 of the whorl 4, so that the upper spindle portion 3 is still secured against being lifted off inadvertently.

When the control slide 21 is pulled out by the closure ledge 24, for example by hand, until the edge of the recess 22 abuts the bulge 23, the cover 8 is slightly deformed, in order to release in this manner the aforesaid detent formed by the excrescences 29 engaging the recesses 28. The brake levers 14 are spread either forceclosed by the spring 18, or form-closed, as it were, for an additional safeguard, by means of the groove 26 and the pin 27 engaging into the same, until the brake levers 14 in the third position do no longer reach under the collar 17, and accordingly the upper spindle portion 3 can be removed without hindrance from its lower portion 2. After the reinsertion of the upper spindle portion 3, the control slide 21 is restored either by the knee or by hand to its middle position, which is accurately defined by the co-operation of the spring 18 with the excrescences 29 abutting the edges of the recesses 28.

Figure 9:
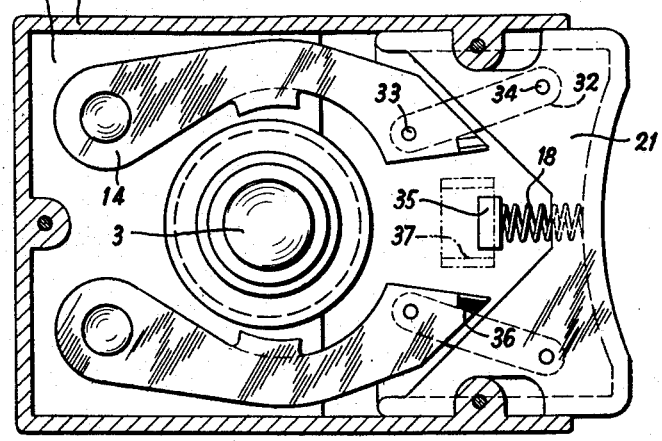
FIG. 9 is a plan view similar to FIG. 3 of a second embodiment.

A further embodiment is illustrated in FIG. 9. The driving connection between the control slide 21 and the brake levers 14 is formed by two obliquely positioned links 32, which are articulated each by a pin 33 and 34 to the control slide 21 and to each of the brake levers 14 respectively. These links 32 likewise constitute a form-closed connection, which moreover involves the advantage that owing to their greater inclination in the braking position the component force applied to the brake shoes 15 increases with increasing inclination. The embodiment shows that the spring 18 need not necessarily be arranged between the brake levers 14; for example, as shown in FIG. 9, it may be preloaded between a projection 35 of the base plate 7 and the control slide 21. Moreover this embodiment shows that it is only important that the detent holds the whole brake system in its middle position. Accordingly the detent shown in the first embodiment is not indispensible for holding the control slide 21 fast; alternatively such a detent may according to FIG. 9 hold the brake levers 14 in their normal position, the same having excrescences 36, which in the normal position engage into a recess 37 at the inside of the cover 8. The cover 8 has likewise to be deformed, as described, in order to allow the brake levers 14 to assume their release position, in which the spindle is released.

Figure 10:
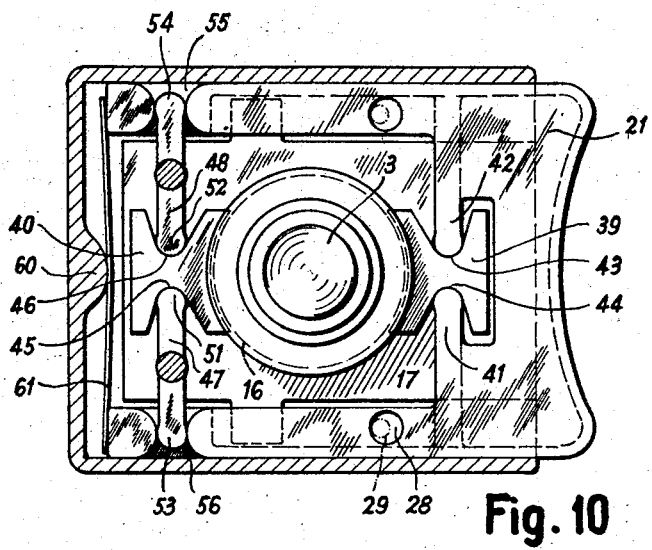
FIG. 10 is a plan view similar to FIG. 1 of a third embodiment.
Figure 11:
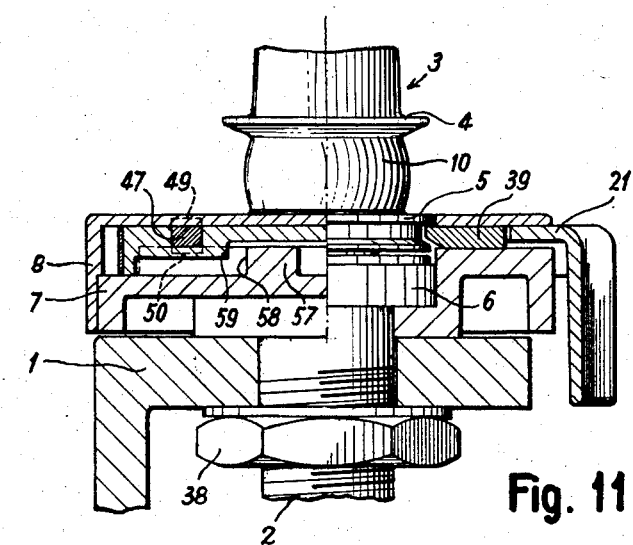
FIG. 11 is an elevation of the spindle, the casing and the brake levers being illustrated in section of the form shown in FIG. 10.

A third embodiment is illustrated in the FIGS. 10 and 11. The casings 7, 8 is likewise clamped to the spindle bank 1, by the aid of the flange 6, lower portion 2 and of a nut 38. In the casings 7, 8 likewise the control slide 21 is guided shiftable to-and-fro as viewed from the side of the operator. However the control slide embraces at least partly the whorl 4, to the annular recess 16 of which the two brake shoes 39 and 40 are applied in the braking position. The two brake shoes 39, 40 are arranged slidably in the axis of the control slide fore-and-aft of the whorl. The first brake shoe 39 is in driving connection with the control slide 21 in the same sense of movement, while the second brake shoe 40 is in a reversing connection therewith. The said driving connection in the case of the first brake shoe 39 consists of two fingers 41 and 42, which in turn lie ahead of the whorl and form part of the control slide 21, and are articulated to the brake shoe 39 by their opposite rounded ends engaging into two opposite pans 43, 44. In this manner the brake shoe 39 is somewhat resilient with respect to the control slide 21, and can adapt itself with its brake surface accurately to the annular recess 16. The brake shoe 40 on the other hand is held between its opposite pans 45 and 46 by the ends 51 and 52 of the two-armed levers 47 and 48, these levers being pivotally mounted with their pins 49 and 50 in the cover 8 and bottom 7 of the casing, respectively. The other ends 53 and 54 of the levers 47 and 48 are pivotally held each in a rounded recess 55 and 56, respectively, in those parts of the control slide 21, which embrace the whorl.

As in the previous embodiments, the control slide 21 has a recess 28 which co-operates with an excrescence 29 arranged on the cover of the casing. Moreover the bottom 7 has an abutment 57, the edge 58 of which limits the shifting of the control slide 21 thereby that the same abuts a shoulder 59 of the slide, when the latter is pulled out. A leaf spring 61 resting on a bulge 60 of the casing 8 tends to push the control slide 21 outwardly.

The manner of operation is again quite similar to that of the previous embodiments. In the middle position, the control slide is fixed by the excrescence 29 abutting the inner edge of the recess 28 under the action of the leaf-spring 61. When pressure is applied to the control slide from outside, the brake shoe 39 is applied to the whorl 4 in the same sense of direction, while the brake shoe 40 is applied to the whorl in the opposite sense by the two-armed levers 47, 48 from the rear of the whorl, so that the same is loaded from opposite sides practically with equal forces. Therefore any skewing of the spindle is obviated.

When, on the other hand, the control slide is pulled as far as possible out of the casing, the two brake shoes 39, 40 are moved in opposite directions until the flange-like extension 17 no longer reaches under the brake shoes, and the upper spindle portion 3 is released for being lifted off.

It should moreover be remarked that the brake could be constructed alternatively as an internal shoe brake without altering the invention, in which case the flange-like extension 5 of the whorl 4 protrudes inwardly.

What I claim as my invention and desire to secure by Letters Patent, is:

1. A spinning- and twining-spindle arrangement comprising in combination: a stationary structure, a lower spindle portion having a flange and fixed to said structure, an upper spindle portion journalled rotatably in said lower spindle portion and capable of being lifted off axially therefrom, said upper spindle portion having a whorl, a pulley surface and a flange-like extension below said pulley surface, a brake mounted in said structure having a horizontally acting brake element having a normal position and a braking position in which said flange-like extension of said upper spindle reaches under it and a release position clear of said flange-like extension, and a control slide coupled to said brake element and shiftable horizontally to-and-fro in said structure from a middle position corresponding to said normal position of said brake element to one extreme position applying said brake element to said upper spindle portion, and to another extreme position corresponding to said release position.

2. A spinning- and twining-spindle arrangement comprising in combination: a stationary structure, a lower spindle portion having a flange and fixed to said structure, an upper spindle portion journalled rotatably in said lower spindle portion and capable of being lifted off axially therefrom, said upper spindle portion having a whorl, a pulley surface and a flange-like extension below said pulley surface, a brake mounted in said structure having a horizontally acting brake element, said stationary structure comprising a spindle bank and a casing clamped between said flange of the lower portion of each spindle of said bank and the latter, said casing enclosing said brake element, said flange of the lower spindle portion and flange-like extension of the upper spindle portion, and having one bore on top and one bore at the bottom, said whorl emerging upwardly from said bore on top, and said lower spindle portion downwardly from said bore at the bottom of said casing.

3. A spinning- and twining-spindle arrangement as claimed in calim 2 comprising cover ledges covering the gaps between adjacent casing, each of said ledges having a T-shaped profile and having clamping means engaging said adjacent casings.

4. A spinning- and twining-spindle arrangement comprising in combination: a stationary structure, a lower spindle portion having a flange and fixed to said structure, an upper spindle portion journalled rotatably in said lower spindle portion and capable of being lifted off axially therefrom, said upper spindle portion having a whorl, a pulley surface and a flange-like extension below said pulley surface, a brake mounted in said structure having a horizontally acting brake element and a control slide coupled to said brake element and shiftable horizontally to and fro in said structure, said stationary structure comprising a spindle bank and a casing clamped between said flange of the lower portion of each spindle of said bank and the latter, said casing enclosing said brake element, said flange of the lower spindle portion and flange-like extension of the upper spindle portion, and having one bore on top and one bore at the bottom, said whorl emerging upwardly from said bore top, and said lower spindle portion downwardly from said bore at the bottom of said casing, said control slide having a forward closure ledge forming the frontal closure of said casing.

5. A spinning- and twinning-spindle arrangement as claimed in claim 4, wherein said forward closure ledge is juxtaposed to said casing and to said spindle bank.

6. A spinning- and twining-spindle arrangement comprising in combination: a stationary structure, a lower spindle portion fixed to said structure, an upper spindle portion journalled rotatably in said lower spindle portion and capable of being lifted off axially therefrom, said upper spindle portion having a whorl, a pulley surface and a flange-like extension below said pulley surface, a control slide shiftable to-and-fro and at least partly embracing said whorl, two brake shoes slidably arranged in said structure in the direction of the movements of said control slide fore-and-aft of said whorl, respectively, the first one of said brake shoes being in unidirectional, and the second one in reversed driving connection with said control slide, said brake shoes having a normal position and a braking position, in which said flange-like extension of said upper spindle portion reaches under them, and a release position clear of said flange-like extension.

7. A spinning- and twining-spindle arrangement as claimed in claim 6, comprising two fingers of said control slide pointing in opposite directions at right angles to the direction of movement thereof, two two-armed levers pivotally mounted in said casing and each with one arm articulated to said control slide, said first brake shoe having two opposite pans engaged by rounded ends of said fingers, respectively, and said second brake shoe having two opposite pans engaged by rounded ends of said other arms of said double armed levers, respectively.

References Cited in the file of this patent
UNITED STATES PATENTS

| | | |
|---|---|---|
| 2,333,047 | Schlums | Oct. 26, 1943 |
| 2,800,762 | Wurmli | July 30, 1957 |